United States Patent
Jain et al.

(10) Patent No.: US 12,271,744 B2
(45) Date of Patent: Apr. 8, 2025

(54) JOB MODIFICATION TO PRESENT A USER INTERFACE BASED ON A USER INTERFACE UPDATE RATE

(71) Applicant: Adobe Inc., San Jose, CA (US)

(72) Inventors: Mayuri Jain, Bangalore (IN); Reetesh Mukul, Bangalore (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 18/442,995

(22) Filed: Feb. 15, 2024

(65) Prior Publication Data

US 2024/0184600 A1    Jun. 6, 2024

Related U.S. Application Data

(63) Continuation of application No. 17/061,273, filed on Oct. 1, 2020, now Pat. No. 11,934,846.

(51) Int. Cl.
| | |
|---|---|
| *G06F 9/451* | (2018.01) |
| *G06F 3/04817* | (2022.01) |
| *G06F 3/0482* | (2013.01) |
| *G06F 3/0485* | (2022.01) |
| *G06F 9/30* | (2018.01) |
| *G06F 9/38* | (2018.01) |
| *G06F 9/48* | (2006.01) |

(52) U.S. Cl.
CPC .......... *G06F 9/451* (2018.02); *G06F 3/04817* (2013.01); *G06F 3/0482* (2013.01); *G06F 3/0485* (2013.01); *G06F 9/30076* (2013.01); *G06F 9/3836* (2013.01); *G06F 9/4881* (2013.01)

(58) Field of Classification Search
CPC .... G06F 9/451; G06F 3/04817; G06F 3/0482; G06F 3/0485; G06F 9/30076; G06F 9/3836; G06F 9/4881; G06F 3/04883
See application file for complete search history.

(56) References Cited

U.S. PATENT DOCUMENTS

| | | |
|---|---|---|
| 8,537,180 B1 | 9/2013 | Grieve |
| 11,934,846 B2 | 3/2024 | Jain et al. |
| 2005/0041031 A1 | 2/2005 | Diard |
| 2013/0239049 A1 | 9/2013 | Perrodin et al. |
| 2015/0254806 A1 | 9/2015 | Circlaeys et al. |
| 2018/0047136 A1* | 2/2018 | Kaldor ................. G06F 9/505 |
| 2019/0138354 A1* | 5/2019 | Kuo ..................... G06F 9/5027 |

(Continued)

OTHER PUBLICATIONS

"Process calculus", Wikipedia the Free Encyclopedia [retrieved Dec. 3, 2020]. Retrieved from the Internet <https://en.wikipedia.org/wiki/Process_calculus>., Aug. 1, 2020, 6 pages.

(Continued)

*Primary Examiner* — Jorge A Chu Joy-Davila
(74) *Attorney, Agent, or Firm* — FIG. 1 Patents

(57) ABSTRACT

A job scheduling system determines a rate at which a user is providing user inputs to a user interface of a computing device. A set of jobs that is to be performed to display or otherwise present a current view of the user interface is identified in response to a user input. This set of jobs is modified by excluding from the set of jobs at least one job that is not estimated to run prior to the next user input. The user interface is displayed or otherwise presented as the modified set of jobs is performed.

20 Claims, 5 Drawing Sheets

(56) References Cited

U.S. PATENT DOCUMENTS

2020/0310612 A1    10/2020   Vincent et al.
2022/0107819 A1    4/2022   Jain et al.

OTHER PUBLICATIONS

"Stochastic probe", Wikipedia the Free Encyclopedia [retrieved Dec. 3, 2020]. Retrieved from the Internet <https://en.wikipedia.org/wiki/Stochastic_probe>., Feb. 13, 2019, 1 page.

U.S. Appl. No. 17/061,273, "First Action Interview Office Action", U.S. Appl. No. 17/061,273, Jul. 27, 2023, 3 pages.

U.S. Appl. No. 17/061,273, "Notice of Allowance", U.S. Appl. No. 17/061,273, Nov. 15, 2023, 16 pages.

U.S. Appl. No. 17/061,273, "Pre-Interview First Office Action", U.S. Appl. No. 17/061,273, Jun. 29, 2023, 3 pages.

Adelson, Edward H, et al., "Pyramid methods in image processing", RCA Engineer [retrieved on Oct. 12, 2020]. Retrieved from the Internet <http://citeseerx.ist.psu.edu/viewdoc/summary?doi=10.1.1.56.8646>., Nov. 12, 1984, 9 pages.

Gonzalez, Rafael C, et al., "Digital Image Processing (2nd Edition)", Pearson Publishing. Retrieved from the Internet <http://web.ipac.caltech.edu/staff/fmasci/home/astro_refs/Digital_Image_Processing_2ndEd.pdf>., Apr. 30, 1992, 796 pages.

Klette, Reinhard , "Concise Computer Vision: An Introduction into Theory and Algorithms", Springer [retrieved on Oct. 12, 2020]. Retrieved from the Internet <shorturl.at/bcdF5>., Jan. 4, 2014, 441 pages.

Mowers, Christopher , "Lightroom vs. Capture One: An in depth comparison", Improve Photography, Nov. 2017, 16 pages.

Szeliski, Richard , "Computer Vision: Algorithms and Applications", Springer Science & Business Media [retrieved Dec. 3, 2020]., Aug. 5, 2010, 989 pages.

\* cited by examiner

JOB MODIFICATION TO PRESENT A USER INTERFACE BASED ON A USER INTERFACE UPDATE RATE

RELATED APPLICATIONS

This application is a continuation of and claims priority to U.S. patent application Ser. No. 17/061,273, filed Oct. 1, 2020, entitled "Job Modification To Present A User Interface Based On A User Interface Update Rate," the entire disclosure of which is hereby incorporated by reference herein in its entirety.

BACKGROUND

As computing technology has advanced so too have the uses for computing devices. Users oftentimes desire to consume data from various different sources, including local or remote sources (e.g., accessed via a network). Given the various sources and the amount of data available for consumption, delays in displaying or otherwise presenting the data oftentimes arise. These delays are exacerbated in situations where a user provides various inputs to consume the data resulting in different actions needing to be taken in order to display or otherwise present the data.

For example, assume an image processing program running on a computing device allows a user to organize and edit a collection of tens of thousands of images. Further assume that the image processing program displays a grid of thumbnail images (e.g., 9 or 12 thumbnail images) as well as a preview of at least one image at a time. Each time a user input is received that changes which thumbnail images are displayed or which at least one preview is displayed, various actions are performed by the image processing program. These actions include retrieving thumbnail images, displaying thumbnail images, retrieving at least one preview, displaying at least one preview, and so forth. Given the possibly remote source of the thumbnails and previews, the quantity of thumbnail images and previews, and the sizes of the thumbnail images and previews (e.g., megabytes), performing these actions oftentimes takes an amount of time that results in a delay between the user input and the desired thumbnail images or at least one preview being displayed. This delay is exacerbated in situations in which the user repeatedly provides user inputs (e.g., hits a button to scroll through the thumbnails numerous times in quick succession) because the image processing program oftentimes has not performed all of the actions that are to be performed in response to one user input when a subsequent user input is received.

These delays between the user providing an input and the result of that input being displayed or otherwise presented are frustrating to users, which leads to user dissatisfaction and frustration with their programs and computing devices.

SUMMARY

To mitigate the drawbacks of conventional solutions for displaying or otherwise presenting user interfaces, a job scheduling system to modify a set of jobs to be performed to present a current user interface (UI) based on a UI update rate is described. In one or more implementations, in at least one computing device multiple user inputs to the UI are received including a first user input and a second user input. A UI update rate is determined, based on the first user input and the second user input, which is an indication of the rate at which the user is providing user inputs to the UI. A set of jobs to be performed to present a current view of the UI is modified, based on the UI update rate, by excluding from the set of jobs at least one job that is not estimated to run prior to a next user input. The current view of the UI is displayed or otherwise presented as the modified set of jobs is performed.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
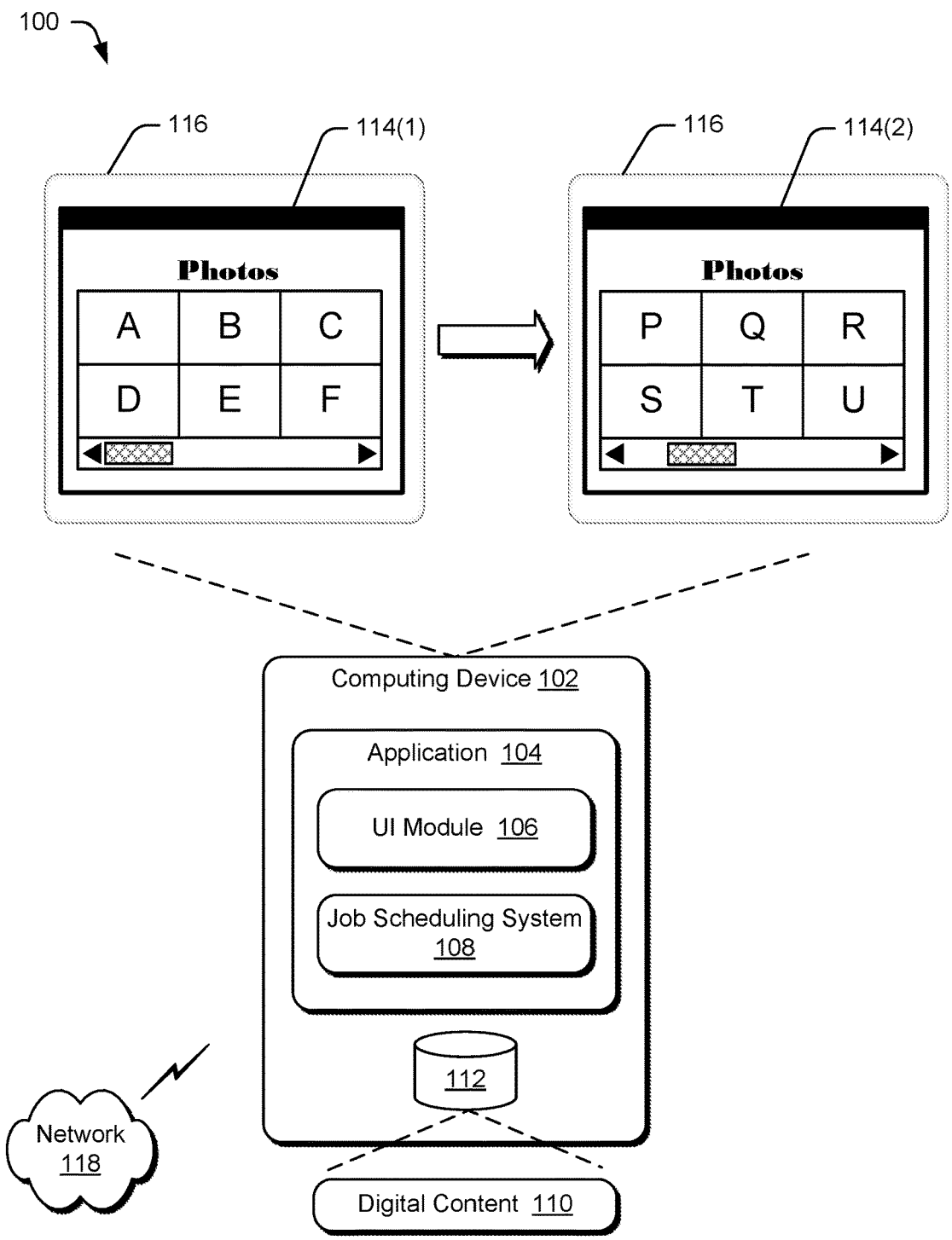
FIG. 1 is an illustration of a digital medium environment in an example implementation that is operable to employ the job modification to present a user interface based on a user interface update rate described herein.

Techniques for implementing job modification to present a user interface based on a user interface update rate are discussed herein. Generally, the techniques discussed herein determine a rate at which a user is providing user inputs to a user interface (UI), referred to as the UI update rate. A set of jobs that is to be performed to display or otherwise present a current view of the user interface is identified in response to a user input. This set of jobs is modified by excluding from the set of jobs at least one job that is not estimated to run prior to the next user input. The user interface is displayed or otherwise presented as the modified set of jobs is performed.

More specifically, user inputs are received and a set of jobs to perform to present a current user interface based on the user inputs is determined. For example, assume an application implementing the techniques discussed herein is an image processing program that allows a user to organize and edit a collection of tens of thousands of images, and that the application displays a grid of thumbnails of a limited number of the images at any time. In response to a user input to scroll through the grid, a current view of the user interface (e.g., which thumbnails are to be displayed where in the grid) is determined, jobs to obtain thumbnails of images to be displayed in the grid are generated, jobs to obtain a larger preview of an individual image (e.g., a preview image that corresponds to the thumbnail image that the user is hovering over with a pointer but is larger than the thumbnail image)

are generated, jobs to obtain the full image corresponding to the thumbnail image that the user is hovering over with a pointer are generated, jobs to obtain metadata regarding the image (e.g., information describing the time, date, and capture settings when the image was captured) are generated, and so forth. These jobs are performed, for example, by one or more agents.

A UI update rate is generated that is an indication of the rate at which the UI is being updated in response to user inputs and thus also an estimate of when the next user input is expected to be received. In one or more implementations, the UI update rate is generated based on the time at which two or more user inputs immediately preceding the current time are received. The user provides user inputs at various rates and the UI update rate identifies the current rate. For example, situations arise in which the time between user inputs is short (e.g., a user repeatedly provides user inputs in short succession such as by hitting a button to scroll through the thumbnails numerous times in short succession, by repeatedly and quickly changing which thumbnail a mouse is hovering over to cause a preview of the thumbnail to be displayed) as well as in which the time between user inputs is long (e.g., the user inputs a scroll gesture once every 20-30 seconds).

In one or more implementations, if two user inputs are received in less than a threshold amount of time (e.g., 1 millisecond), only one of those two user inputs is used to determine the UI update rate. This threshold amount is set to reduce noise and prevent small changes in movement of an input device from being detected as a user input. For example, if a user positions a pointer over a thumbnail using a mouse but the user's hand shakes a bit while holding the mouse, the small change in position of the mouse is not interpreted as a user input because doing so would incorrectly lead to determining that the UI update rate is very large.

The set of jobs is pruned or modified by excluding from the set of jobs at least one job that is not estimated to run prior to the next user input. Whether to prune the set of jobs is determined based at least in part on the UI update rate. If the UI update rate indicates that the UI is being updated quickly then more jobs are pruned than if the UI update rate indicates that the UI is being updated slowly. E.g., if the UI update rate indicates that the UI is being updated quickly then the results of some jobs performed in response to one user input would not be visible to or perceivable by the user because the user is expected to enter a subsequent user input shortly after the previous user input.

Which jobs are pruned is determined in various manners, such as based on whether the jobs correspond to visible components of the UI, the priorities of the jobs, which jobs are cancelable, and so forth. In one or more implementations, some jobs are cancelable while other jobs are not cancelable. For example, in some implementations a job to display a preview image of a photo is cancelable whereas a job to delete the image is not cancelable.

Which UI components are visible in a current view of the user interface changes based on the user inputs. In one or more implementations, various techniques are used to cancel jobs in the set of jobs that are for UI components that, as a result of a user input, are no longer visible to the user. One such technique is to delete or remove any jobs, for a UI component that is no longer visible to the user, that have not yet been sent to an agent to perform. Another such technique is to communicate a job cancelation notification, for a UI component that is no longer visible to the user, to the agent to which the job has already been sent. These techniques allow for deletion or cancellation of a job and avoid expending resources in performing the job for a UI component that is no longer visible to the user.

In one or more implementations, priorities of different components in the user interface are identified. The priorities of different UI components are identifiable using various techniques. One such technique is to receive an indication of the priorities of different components in the UI from the application displaying the UI. For example, the application indicates that obtaining and displaying thumbnail images is higher priority than displaying a preview image or metadata.

Another technique is to determine the priorities of different UI components based on the user inputs. For example, assume a grid has three rows of thumbnail images and a particular user input to scroll the grid down results in what was (prior to the particular user input) the top row of thumbnail images no longer being displayed, what was (prior to the particular user input) the middle row of thumbnail images being displayed as the top row, what was (prior to the particular user input) the bottom row of thumbnail images being displayed as the middle row, and a new row of thumbnail images being displayed as the bottom row. In this example, thumbnail images that are newly displayed in the grid (the bottom row) are identified as being higher priority than thumbnail images that were displayed in the grid prior to the particular user input (the top and middle rows).

Another technique is to use various other rules or criteria to determine the priority of different UI components. Various information regarding user inputs is maintained to determine the priority of different UI components, such as how many times a user input selecting a UI component is received, how often a UI component is visible (e.g., obtained from visible component detection module), and so forth. For example, UI components (e.g., thumbnail images) that have previously been selected by the user are higher priority than UI components that have not previously been selected by the user. By way of another example, UI components that are selected by the user more frequently are higher priority than UI components that are selected less frequently by the user. By way of another example, UI components that have been displayed for a longer amount of time are higher priority than UI components that have been displayed for a shorter amount of time. In one or more implementations, priorities are set for UI components, from highest priority to lowest priority, as UI components that have previously been selected by the user, UI components that neighbor (e.g., are adjacent to) UI components that have previously been selected by the user, other UI components in order from being visible for the longest amount of time to the shortest amount of time.

The UI component priorities are used to prune jobs from the set of jobs. Various techniques are used to assign a higher priority to jobs associated with displaying or otherwise presenting components of the UI that are higher priority than to jobs associated with displaying or otherwise presenting components of the UI that are lower in priority. One such technique is to send jobs that are higher priority to agents before sending jobs that are lower priority. This results in pruning lower priority jobs if they are not performed before a next user input rendering the UI components corresponding to the lower priority jobs are no longer visible. Another such technique is to delete or remove any lower priority jobs, optionally in response to determining that the UI update rate is above a threshold value. This allows expending resources in performing a lower priority job that is not estimated to be run prior to the next user input to be avoided.

In one or more implementations, each job includes two functions, referred to as a normal function and a delay function, and two delay values, referred to as a normal speed delay and a fast speed delay. The normal function or the delay function is run based on the UI update rate. The normal function refers to a function or module that is invoked when the UI update rate is low, indicating that the time between user inputs is long. The normal speed delay is an amount of time to wait before performing the normal function. The delay function refers to a function or module that is invoked when the UI update rate is high, indicating that the time between user inputs is short. The fast speed delay is an amount of time to wait before performing the delay function.

A threshold value is selected to be a value that is an amount of time that all (or at least a large number) of the jobs to be performed to update the UI in response to a user input are estimated to be performed. If the UI update rate is greater than the threshold value then, if the fast speed delay is zero then the delay function is run immediately, but if the fast speed delay is not zero then the delay function is run after the fast speed delay time elapses. If the UI update rate is not greater than the threshold value then, if the normal speed delay is zero then the normal function is run immediately, but if the normal speed delay is not zero then the normal function is run after the normal speed delay time elapses.

The normal function is the function that performs the job, such as retrieval of a preview image or thumbnail image. The delay function is a function or command that runs quicker than the normal function. In one or more implementations, the delay function is a no operation (no-op) command, which effectively cancels the job because the no-op command is performed rather than the normal function. Additionally or alternatively, the delay function is a function that performs one or more operations quicker than the normal function would take, such as performing a check or verification on received data rather than retrieving data from a storage device.

A fast speed delay of greater than zero allows for adapting to changes in the UI update rate in situations in which the UI update rate is greater than the threshold value. In one or more implementations, certain jobs are rescheduled or delayed based at least in part on the UI update rate. A fast speed delay of greater than zero provides an amount of time (e.g., the fast speed delay amount of time) to determine whether to reschedule or delay the job rather than performing the delay function, allowing the normal function to be run at a later time rather than running the delay function. A fast speed delay of zero allows for bypassing adapting to changes in the UI update rate by rescheduling or delaying jobs. Providing a fast speed delay of zero allows, for example, the job to be indicated as not reschedulable or delayable.

Similarly, a normal speed delay of greater than zero allows for adapting to changes in the UI update rate in situations in which the UI update rate is not greater than the threshold value. A normal speed delay of greater than zero provides an amount of time (e.g., the normal speed delay amount of time) to determine whether to reschedule or delay the job rather than performing the normal function, allowing the normal function to be run at a later time in favor of other jobs, such as previously rescheduled or delayed jobs. Providing a normal speed delay of zero allows, for example, the job to be indicated as not reschedulable or delayable.

In one or more implementations, a determination is made as to whether to delay updating the UI in response to a user input until at least a threshold amount (e.g., all) of the UI components have been retrieved by the agent(s). The jobs and responses are monitored and an amount of time that typically elapses between issuance of a job to retrieve data (e.g., a thumbnail image) and a response including the retrieved data is determined. An example of determining this amount of time is determining the average amount of time between issuance of a job to retrieve data (e.g., a thumbnail image) and a response including the retrieved data over some time period (e.g., the previous 5 or 10 seconds).

In response to a user input, an estimated amount of time to retrieve the data for the currently visible components is determined. Given the UI update rate and the estimated amount of time to retrieve the data for the currently visible components, whether a threshold amount (e.g., all) of the visible components are estimated to be retrieved prior to the next user input is determined. If a threshold amount (e.g., all) of the visible components are estimated to be retrieved prior to the next user input, updating the UI in response to the user input is delayed until at least the threshold amount (e.g., all) of the UI components have been retrieved by the agent(s). However, if the threshold amount (e.g., all) of the visible components are estimated not to be retrieved prior to the next user input, updating the UI in response to a user input is not delayed until at least the threshold amount (e.g., all) of the UI components have been retrieved by the agent(s). Rather, for example, the UI is updated as the UI components are received from the agent(s).

In one or more implementations, one or more future ranges of UI components to include in the UI are predicted based on the UI update rate and previous user inputs, and prioritized. The results for jobs corresponding to a future range of UI components are maintained or cached and used, in response to receipt of a user input to display or otherwise present that future range of UI components. A future range of UI components is predicted in various manners, such as by detecting patterns in the user inputs using any of a variety of public or proprietary techniques. For example, in response to a threshold number of immediately previous user inputs to scroll forward a particular amount in a grid, a prediction is made that the next user input is to scroll forward that particular amount in the grid.

By way of example, assume a grid has three rows of thumbnail images and the user is providing user inputs by repeatedly selecting a scroll button that scrolls the grid three rows ahead. In response to five previous selections of the scroll button with a particular amount of time (e.g., 5 seconds) between user inputs (resulting in a low UI update rate), it is predicted that the next user input is selection of the scroll button after approximately that same particular amount of time. Accordingly, in response to the most recent user input, jobs to display the appropriate three rows of thumbnail images resulting from that user input are communicated to the agent(s), then jobs to receive data to display for the next three rows of thumbnail images to be displayed assuming the predicted user input is received next are communicated to the agent(s). Accordingly, if the predicted user input is received, the UI components for the UI display based on that predicted user input are readily available and the UI display is updated quickly. In one or more implementations, jobs to display the appropriate three rows of thumbnail images resulting from the most recent user input are assigned a higher priority and jobs to receive data to display for the next three rows of thumbnail images to be displayed assuming the predicted user input is received next are assigned a lower priority.

The techniques discussed herein cancel or reschedule jobs performed to display or otherwise present a current view of a user interface. Jobs which are not estimated to run prior to the next user input are canceled or rescheduled, avoiding the need to expend resources (e.g., processing power, data transfer bandwidth) performing those jobs. If a job is rescheduled, this allows the job to subsequently be canceled if subsequent user inputs result in the UI component corresponding to the job no longer being displayed or otherwise presented.

Furthermore, the techniques discussed herein are dynamic, adjusting to changes in the system. For example, canceling and rescheduling jobs varies automatically based on the UI update rate. Accordingly, as the user changes the rate at which she provides inputs, the techniques discussed herein allow for switching between 1) performing jobs and 2) canceling or rescheduling jobs, conserving resources (e.g., processing power, data transfer bandwidth) when appropriate.

Term Descriptions

These term descriptions are provided for purposes of example only and are not intended to be construed as limiting on the scope of the claims.

The term "job" refers to one or more actions to be taken in order to perform a particular task. Examples of jobs include retrieving thumbnail image for display in a UI, retrieving preview images for display in a UI, retrieving metadata for thumbnail or preview images displayed in a UI, and so forth.

The term "UI component" refers to a portion of a UI that is displayed or otherwise presented. Examples of UI components include thumbnail images, preview images, icons, descriptive text, audio playback, and so forth.

The term "current view" of a UI refers to a current display or other presentation of the UI. The current view includes multiple UI components and changes in response to user inputs. An example of a current view of a UI is a display of a grid of multiple thumbnail images and the thumbnail images displayed change in response to user inputs (e.g., to scroll through the grid).

The term "geometric change" to a UI refers to a change in the positioning or ordering of UI components. An example of a geometric change is changing a displayed grid of thumbnail images from a 3 by 3 grid to a 4 by 4 grid in response to a user resizing a window displaying the current view of the UI or changing the sizes of the thumbnail images.

In the following discussion, an example environment is first described that employs examples of techniques described herein. Example procedures are also described which are performable in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ the job modification to present a user interface based on a user interface update rate described herein. The illustrated environment 100 includes a computing device 102, implemented in any of a variety of ways. Examples of the computing device 102 include a mobile device (e.g., assuming a handheld configuration such as a tablet or mobile phone), a wearable device (e.g., augmented reality or virtual reality headsets), a camera, a laptop computer, a desktop computer, and so forth. Thus, implementations of the computing device 102 range from full-resource devices with substantial memory and processor resources (e.g., personal computers, game consoles) to low-resource devices with limited memory and/or processing resources (e.g., mobile devices). Additionally, although a single computing device 102 is shown, additionally or alternatively the computing device is representative of a plurality of different devices, such as multiple servers utilized by a business to perform operations "over the cloud" as described in FIG. 5.

The computing device 102 is illustrated as including an application 104 having a user interface (UI) module 106 and a job scheduling system 108. The application 104 is implemented to provide any of a variety of functionality, such as an image processing program that allows a user to organize and edit a collection of tens of thousands of images, an audio processing program that allows a user to organize and edit a collection of tens of thousands of songs, a document processing program that allows a user to organize and edit a collection of tens of thousand of documents, and so forth.

The application 104 is implemented at least partially in hardware of the computing device 102 to process and transform digital content 110, which is illustrated as maintained in storage 112 of the computing device 102. Such processing includes creation of the digital content 110 and rendering of the digital content 110 as a UI 114 for output, e.g., by a display device 116. The digital content 110 refers to any of a variety of different types of digital content, such as image content, video content, audio content, and so forth. Although illustrated as being displayed, additionally or alternatively the UI is presented in other manners (e.g., audibly, haptically). The storage 112 is any of a variety of different types of storage, such as random access memory (RAM), Flash memory, solid state drive, magnetic disk drive, and so forth. Although illustrated as implemented locally at the computing device 102, additionally or alternatively functionality of the application is implemented in whole or part via functionality available via a network 118, such as part of a web service or "in the cloud."

The UI module 106 implements functionality to display or otherwise present the UI 114 as well as to receive user inputs to change the UI. These user inputs are received in any of a variety of different manners, such as via physical keys (e.g., page up or page down keys on a physical keyboard), mouse buttons, track balls, mouse scrolling, touch screen (e.g., software keyboard, gestures), combination of keyboard keys and mouse scrolling, touch pads, jog wheels, UI buttons, and so forth.

The job scheduling system 108 implements functionality to schedule jobs to perform based on received user inputs to change the UI. These jobs include, for example, retrieving and presenting (e.g., displaying) thumbnail images of digital content, retrieving and presenting (e.g., displaying) at least one preview of digital content, retrieving and presenting (e.g., displaying) complete digital content (e.g., a full image), retrieving and presenting (e.g., displaying) metadata associated with the digital content, and so forth. The job scheduling system 108 determines a set of jobs that is to be performed to display or otherwise present a current view of the UI 114 in response to a user input. This set of jobs is modified by excluding from the set of jobs at least one job that is not estimated to run prior to the next user input. This allows the UI module 106 to, for example, obtain and present thumbnails, previews, or complete digital content quickly in response to user inputs. E.g., a first UI 114(1) is displayed (showing thumbnails of photos A, B, C, D, E, and F) and a user input to scroll to the right is received. In response, the job scheduling system 108 identifies the set of jobs to run that excludes at least one job that is not estimated to run prior to the next user input, resulting in a second UI 114(2) being displayed (showing thumbnails of photos P, Q, R, S, T, and U).

Although the application 104 is illustrated as including the UI module 106 and the job scheduling system 108, the application 104 includes various additional components or modules to perform the functionality of the application 104. Examples of this functionality include creating or editing digital content, organizing digital content, searching for digital content, displaying or otherwise presenting digital content, analyzing digital content, and so forth.

In general, functionality, features, and concepts described in relation to the examples above and below are employable in the context of the example systems and procedures described herein. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combined in different ways. Thus, individual functionality, features, and concepts described in relation to different example environments, devices, components, figures, and procedures herein are usable in any suitable combinations and are not limited to the particular combinations represented by the enumerated examples in this description.

Job Scheduling System Architecture

Figure 2:
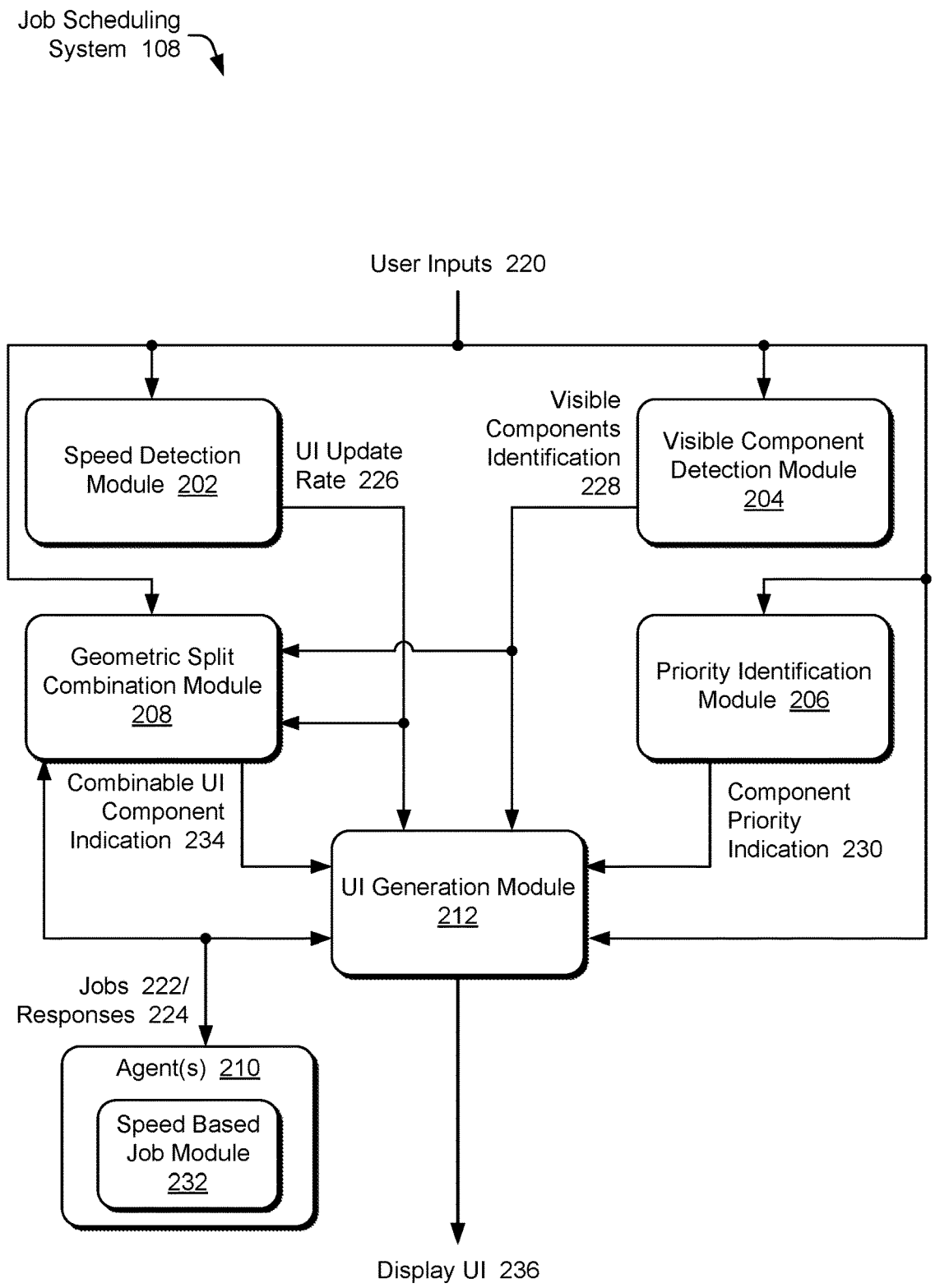
FIG. 2 is an illustration of an example architecture of a job scheduling system.

FIG. 2 is an illustration of an example architecture of a job scheduling system 108. The job scheduling system 108 includes a speed detection module 202, a visible component detection module 204, a priority based cancellation module 206, a geometric split combination module 208, one or more agents 210, and a UI generation module 212.

The UI generation module 212 receives user inputs 220 (e.g., from the UI module 106 of FIG. 1) and determines a set of jobs to perform to present a current user interface based on the user inputs. The set of jobs vary based on the functionality provided by the application 104. For example, assume the application 104 is an image processing program that allows a user to organize and edit a collection of tens of thousands of images, and that the application 104 displays a grid of thumbnails of a limited number of the images at any time. In response to a user input to scroll through the grid, the UI generation module 212 determines a current view of the user interface (e.g., which thumbnails are to be displayed where in the grid) and generates jobs to obtain thumbnails of images to be displayed in the grid, jobs to obtain a larger preview of an individual image (e.g., a preview image that corresponds to the thumbnail image that the user is hovering over with a pointer but is larger than the thumbnail image), jobs to obtain the full image corresponding to the thumbnail image that the user is hovering over with a pointer, jobs to obtain metadata regarding the image (e.g., information describing the time, date, and capture settings when the image was captured), and so forth.

In one or more implementations, some user inputs 220 make a change in the positioning or ordering of UI components. For example, a grid of thumbnail images changes to include different numbers of thumbnail images in response to user inputs 220 to resize a window in which the grid is displayed, user inputs 220 to change the size of thumbnail images in the grid, and so forth.

The UI generation module 212 communicates the jobs 222 to one or more agents 210, which perform the jobs and return responses 224. In one or more implementations different agents 210 are responsible for performing different jobs. For example, a thumbnail agent obtains and returns thumbnail images to be displayed in the grid, a preview agent obtains and returns a preview image of an individual image, an image agent obtains and returns the full image corresponding to a thumbnail image, a database agent obtains and returns metadata regarding an image, and so forth.

The speed detection module 202 implements functionality to generate a UI update rate, illustrated as UI update rate 226. The UI update rate 226 is an indication of the rate at which the UI (e.g., UI 114 of FIG. 1) is being updated in response to user inputs and thus also an estimate of when the next user input 220 is expected to be received. The user provides user inputs 220 at various rates and an indication of each user input 220 is provided to the speed detection module 202. For example, situations arise in which the time between user inputs is short (e.g., a user repeatedly provides user inputs in short succession such as by hitting a button to scroll through the thumbnails numerous times in short succession, by repeatedly and quickly changing which thumbnail a mouse is hovering over to cause a preview of the thumbnail to be displayed) as well as in which the time between user inputs is long (e.g., the user inputs a scroll gesture once every 20-30 seconds).

The speed detection module 202 generates, at any given time t, the UI update rate 226 based on the time at which two or more user inputs 220 immediately preceding time t are received. In one or more implementations, the speed detection module 202 generates the UI update rate 226 based on the times the two user inputs 220 immediately preceding the user input received at time t were received, although additionally or alternatively the speed detection module 202 generates the UI update rate 226 based on the times of three or more user inputs 220 preceding the user input received at time t were received.

In one or more implementations, the speed detection module 202 generates, in response to a user input received at time t, two values rate1 and rate2 as follows:

$$\text{rate1} = \frac{1}{\text{time}(t-2) - \text{time}(t-1)}$$

$$\text{rate2} = \frac{1}{t - \text{time}(t-1)}$$

where time(t−1) and time(t−2) refer to the times that the two immediately preceding user inputs were received. The speed detection module 202 generates the UI update rate 226 (shown as update_rate) as follows:

update_rate=min(rate1,rate2)

where min(rate1,rate2) refers to the one of rate1 and rate2 that is the smaller value. Additionally or alternatively, the speed detection module 202 generates the UI update rate 226 as follows:

update_rate=0.7×(rate1+rate2)+0.3×update_rate(t−1).

In one or more implementations, if two user inputs are received in less than a threshold amount of time (e.g., 1 millisecond), speed detection module 202 uses only one of the two user inputs to determine the UI update rate 226. This threshold amount is set to reduce noise and prevent small changes in movement of an input device from being detected as a user input. For example, if a user positions a pointer over a thumbnail using a mouse but the user's hand shakes a bit while holding the mouse, the small change in position of the mouse is not interpreted by the speed detection module 202 as a user input because doing so would incorrectly lead to determining that the UI update rate 226 is very large.

In one or more implementations, the UI generation module 212 prunes or modifies the set of jobs by excluding from the set of jobs at least one job that is not estimated to run prior to the next user input. Whether to prune the set of jobs is determined based at least in part on the UI update rate 226. If the UI update rate 226 indicates that the UI is being updated quickly then more jobs are pruned than if the UI update rate 226 indicates that the UI is being updated slowly. E.g., if the UI update rate 226 indicates that the UI is being updated quickly then the results of some jobs performed in response to one user input would not be visible to or perceivable by the user because the user is expected to enter a subsequent user input shortly after the previous user input.

Which jobs are pruned is determined in various manners, such as based on whether the jobs correspond to visible components of the UI, the priorities of the jobs, which jobs are cancelable, and so forth. In one or more implementations, some jobs are cancelable while other jobs are not cancelable. For example, in some implementation a job to display a preview image of a photo is cancelable whereas a job to delete the image is not cancelable. Whether a job is cancelable is determined in various manners, such as being indicated by another module of the application 104, being specified by a developer or user of the application 104, and so forth.

In one or more implementations, the visible component detection module 204 identifies, in response to each user input 220, which UI components are visible to the user and which are not visible to the user. For example, assume a particular user input 220 to scroll a grid of thumbnail images results in identification of a new set of thumbnail images to be displayed. The thumbnail images that were previously displayed are no longer visible to the user as a result of the user input, and a new set of thumbnail images that were previously not visible to the user become visible to the user. The visible component detection module 204 outputs a visible components identification 228 to the UI generation module 212 that identifies the visible UI components in response to each user input 220.

The UI generation module 212 uses the visible components identification 228 to prune jobs from the set of jobs. In one or more implementations, the UI generation module 212 implements various techniques to cancel jobs in the set of jobs that are for UI components that, as a result of a user input 220, are no longer visible to the user. One such technique is to delete or remove any jobs, for a UI component that is no longer visible to the user, that have not yet been sent to an agent 210. This allows the UI generation module 212 to avoid expending resources in performing the job for a UI component that is no longer visible to the user. Another such technique is to communicate a job cancelation notification, for a UI component that is no longer visible to the user, to the agent 210 to which the job has already been sent. This allows the agent 210 to delete or remove the job and not expend resources in performing the job for a UI component that is no longer visible to the user.

In one or more implementations, the priority identification module 206 identifies priorities of different components in the user interface and outputs a component priority indication 230 to the UI generation module 212. The priority identification module 206 implements various techniques to identify the priorities of different components in the UI. One such technique is to receive an indication of the priorities of different components in the UI from the application 104. For example, the application 104 indicates that obtaining and displaying thumbnail images is higher priority than displaying a preview image or metadata.

Additionally or alternatively, the priority identification module 206 determines the priorities of different components in the UI based on the user inputs 220. For example, assume a grid has three rows of thumbnail images and a particular user input 220 to scroll the grid down results in what was (prior to the particular user input 220) the top row of thumbnail images no longer being displayed, what was (prior to the particular user input 220) the middle row of thumbnail images being displayed as the top row, what was (prior to the particular user input 220) the bottom row of thumbnail images being displayed as the middle row, and a new row of thumbnail images being displayed as the bottom row. In this example, the priority identification module 206 identifies thumbnail images that are newly displayed in the grid (the bottom row) as being higher priority than thumbnail images that were displayed in the grid prior to the particular user input 220 (the top and middle rows).

Additionally or alternatively, the priority identification module 206 uses various other rules or criteria to determine the priority of different UI components. The priority identification module 206 maintains various information regarding user inputs 220 to determine the priority of different UI components, such as how many times a user input 220 selecting a UI component is received, how often a UI component is visible (e.g., obtained from visible component detection module 204), and so forth. For example, UI components (e.g., thumbnail images) that have previously been selected by the user are higher priority than UI components that have not previously been selected by the user. By way of another example, UI components that are selected by the user more frequently are higher priority than UI components that are selected less frequently by the user. By way of another example, UI components that have been displayed for a longer amount of time are higher priority than UI components that have been displayed for a shorter amount of time. In one or more implementations, priorities are set for UI components, from highest priority to lowest priority, as UI components that have previously been selected by the user, UI components that neighbor (e.g., are adjacent to) UI components that have previously been selected by the user, other UI components in order from being visible for the longest amount of time to the shortest amount of time.

The UI generation module 212 uses the component priority indication 230 to prune jobs from the set of jobs. In one or more implementations, the UI generation module 212 implements various techniques to assign a higher priority to jobs associated with displaying or otherwise presenting components of the UI that are higher priority than to jobs associated with displaying or otherwise presenting components of the UI that are lower in priority. One such technique is to send jobs 222 that are higher priority before sending jobs 222 that are lower priority. This results in pruning lower priority jobs if they are not performed before a next user input 220 rendering the UI components corresponding to the lower priority jobs are no longer visible. Another such technique is to delete or remove any lower priority jobs, optionally in response to determining that the UI update rate 226 is above a threshold value. This allows the UI generation module 212 to avoid expending resources in performing a lower priority job that is not estimated to be run prior to the next user input.

In one or more implementations, at least one agent 210 includes a speed based job module 232 that receives the jobs 222. Each job 222 includes two functions, referred to as a normal function and a delay function, and two delay values, referred to as a normal speed delay and a fast speed delay. The speed based job module 232 runs the normal function or the delay function based on the UI update rate 226. The speed based job module 232 obtains the UI update rate 226 in any of a variety of different manners, such as from the UI generation module 212 or from the speed detection module 202.

Figure 3:
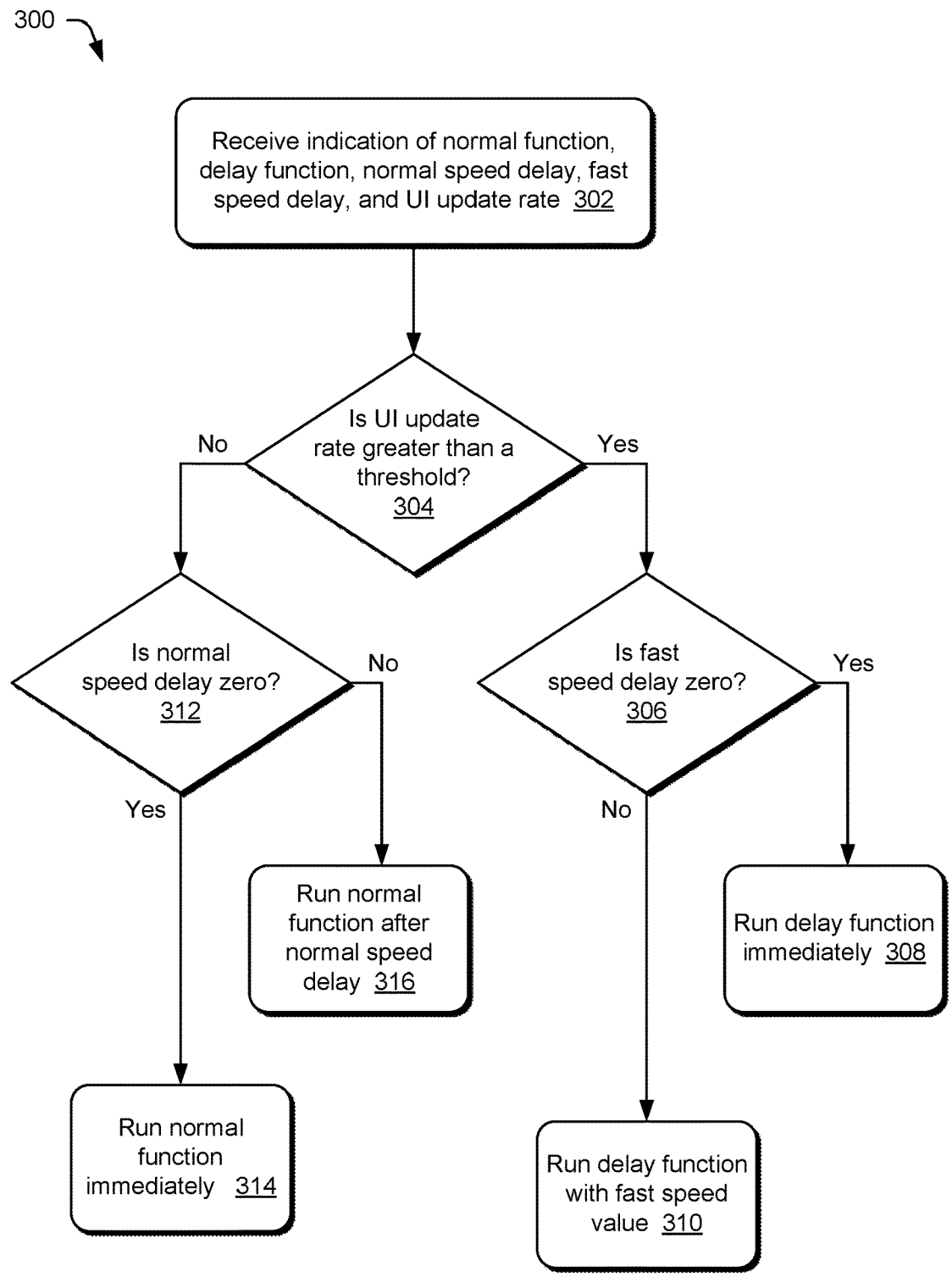
FIG. 3 is a flow diagram depicting a procedure in an example implementation of a speed based job module.

FIG. 3 is a flow diagram depicting a procedure in an example 300 implementation of speed based job module 232. Aspects of example 300 are implementable in hardware, firmware, software, or a combination thereof. Example 300 is shown as a set of blocks that specify operations performed by one or more devices and are not necessarily limited to the orders shown for performing the operations by the respective blocks.

In this example, the speed based job module receives indications of a normal function, a delay function, a normal speed delay, a fast speed delay, and the UI update rate (block 302). These indications are received from one or more modules, such as UI generation module 212.

The normal function refers to a function or module that is invoked when the UI update rate 226 is low, indicating that the time between user inputs is long. The normal speed delay is an amount of time to wait before performing the normal function. The delay function refers to a function or module that is invoked when the UI update rate 226 is high, indicating that the time between user inputs is short. The fast speed delay is an amount of time to wait before performing the delay function.

A check is made as to whether the UI update rate is greater than a threshold value (block 304). The threshold value in block 304 varies based on the application 104 and is selected to be a value that is an amount of time that all (or at least a large number) of the jobs to be performed to update the UI in response to a user input are estimated to be performed. In one or more implementations, the threshold value is set by a developer or user of the application 104. Additionally or alternatively, the threshold value is set automatically, such as by the UI generation module 212. For example, in one or more implementations the UI generation module 212 monitors over time whether all (or at least a large number) of the jobs to be performed to update the UI in response to a user input are being performed. The UI generation module 212 then increases or decreases the threshold value to be equal to an amount of time that all (or at least a large number) of the jobs to be performed to update the UI in response to a user input are estimated to be performed.

If the UI update rate is greater than the threshold then a check is made as to whether a fast speed delay is zero (block 306). If the fast speed delay is zero, then the delay function is run immediately (block 308). However, if the fast speed delay is not zero then the delay function is run after the fast speed delay time elapses (block 310).

Returning to block 304, if the UI update rate is not greater than the threshold then a check is made as to whether the normal speed delay is zero (block 312). If the normal speed delay is zero, then the normal function is run immediately (block 314). However, if the normal speed delay is not zero then the normal function is run after the normal speed delay time elapses (block 316).

The normal function is the function that performs the job, such as retrieval of a preview image. The delay function is a function or command that runs quicker than the normal function. The delay function is a function that is run when the UI update rate is greater than the threshold (as determined in block 304). Accordingly, the faster delay function is run rather than the normal function because it is estimated that the normal function is not going to be run prior to the next user input (e.g., as a result of the priority of the job). In one or more implementations, the delay function is a no operation (no-op) command, which effectively cancels the job because the no-op command is performed rather than the normal function. Additionally or alternatively, the delay function is a function that performs one or more operations quicker than the normal function would take, such as performing a check or verification on received data rather than retrieving data from a storage device.

A fast speed delay of greater than zero allows the speed based job module 232 to adapt to changes in the UI update rate 226 in situations in which the UI update rate 226 is greater than the threshold value. In one or more implementations, the speed based job module 232 reschedules or delays certain jobs based at least in part on the UI update rate. A fast speed delay of greater than zero gives the speed based job module 232 an amount of time (e.g., the fast speed delay amount of time) to determine whether to reschedule or delay the job rather than performing the delay function. The speed based job module 232 reschedules or delays a job to allow the normal function to be run at a later time rather than running the delay function. Whether a job is reschedulable or delayable is determined in various manners, such as being indicated by another module of the application 104, being specified by a developer or user of the application 104, and so forth.

The speed based job module 232 determines when a rescheduled or delayed job is to be performed in various manners, such as by delaying the job until after the UI update rate falls below an additional threshold value. For example, assume the threshold value in block 304 is 1.25 and the additional threshold value is 0.8. In this example, the speed based job module 232 delays the job until the UI update rate drops below 0.8, optionally for a threshold amount of time (e.g., 1 second). This additional threshold value varies based on the application 104 and is selected to be a value that is an amount of time that all (or at least a large number) of the jobs to be performed to update the UI in response to a user input are estimated to be performed with extra time left over (e.g., a buffer time, such as 0.25 seconds). In one or more implementations, this additional threshold value is set by a developer or user of the application 104. Additionally or alternatively, this additional threshold value is set automatically, such as by the UI generation module 212. For example, in one or more implementations this additional threshold value is determined by subtracting a buffer time (e.g., 0.25 seconds) from the threshold value in block 304.

A fast speed delay of zero allows the speed based job module 232 to bypass adapting to changes in the UI update rate by rescheduling or delaying jobs. Providing a fast speed delay of zero allows, for example, the UI generation module 212 to indicate to the speed based job module 232 that the job is not to be rescheduled or delayed.

A normal speed delay of greater than zero allows the speed based job module 232 to adapt to changes in the UI update rate in situations in which the UI update rate is not greater than the threshold value. A normal speed delay of greater than zero gives the speed based job module 232 an amount of time (e.g., the normal speed delay amount of time) to determine whether to reschedule or delay the job rather than performing the normal function. The speed based job module 232 reschedules or delays a job to allow the normal function to be run at a later time in favor of other jobs, such as previously rescheduled or delayed jobs.

The speed based job module 232 determines when a rescheduled or delayed is to be performed in various manners, analogous to the discussion above regarding situations in which the UI update rate is greater than the threshold value, such as by delaying the job until after the UI update rate falls below an additional threshold value. A normal speed delay of zero allows the speed based job module 232 to bypass adapting to changes in the UI update rate by rescheduling or delaying jobs. Providing a normal speed delay of zero allows, for example, the UI generation module 212 to indicate to the speed based job module 232 that the job is not to be rescheduled or delayed.

In one or more implementations the fast speed delay and the normal speed delay are the same values. Additionally or alternatively, the fast speed delay and the normal speed delay are different values. For example, the normal speed delay is longer than the fast speed delay due to the estimated time between user inputs being larger when the UI update rate 226 is not greater than the threshold.

Returning to FIG. 2, the geometric split combination module 208 generates a combinable UI component indication 234 that indicates whether to delay updating the UI in response to a user input 220 until at least a threshold amount (e.g., all) of the UI components have been retrieved by the agent(s) 210. The geometric split combination module 208 monitors the jobs 222 and responses 224 and determines an amount of time that typically elapses between issuance of a job 222 to retrieve data (e.g., a thumbnail image) and a response 224 including the retrieved data. An example of determining this amount of time is determining the average amount of time between issuance of a job 222 to retrieve data (e.g., a thumbnail image) and a response 224 including the retrieved data over some time period (e.g., the previous 5 or 10 seconds).

In response to a user input 220, the geometric split combination module 208 determines an estimated amount of time to retrieve the data for the currently visible components (given visible components identification 228). This determination optionally accounts for data for the currently visible components that was recently retrieved (e.g., in response to the immediately preceding user input 220). Given the UI update rate 226 and the estimated amount of time to retrieve the data for the currently visible components, the geometric split combination module 208 determines whether a threshold amount (e.g., all) of the visible components are estimated to be retrieved prior to the next user input 220. The geometric split combination module 208 outputs the combinable UI component indication 234 that indicates, if a threshold amount (e.g., all) of the visible components are estimated to be retrieved prior to the next user input 220, to delay updating the UI in response to a user input 220 until at least the threshold amount (e.g., all) of the UI components have been retrieved by the agent(s) 210. However, if the threshold amount (e.g., all) of the visible components are estimated not to be retrieved prior to the next user input 220, the combinable UI component indication 234 indicates not to delay updating the UI in response to a user input 220 until at least the threshold amount (e.g., all) of the UI components have been retrieved by the agent(s) 210.

The UI generation module 212 uses the combinable UI component indication 234 to determine when to update the display UI 236. If the combinable UI component indication 234 indicates to delay updating the UI in response to a user input 220 until at least the threshold amount (e.g., all) of the UI components have been retrieved by the agent(s) 210 then UI generation module 212 does so and updates the display UI 236 after at least the threshold amount (e.g., all) of the UI components have been received from the agent(s) 210. This allows for a more uniform UI display because the data for the visible UI components is displayed all at once rather than piecemeal. However, if the combinable UI component indication 234 indicates not to delay updating the UI in response to a user input 220 until at least the threshold amount (e.g., all) of the UI components have been retrieved by the agent(s) 210, the UI generation module 212 does not wait for at least the threshold amount (e.g., all) of the UI components to be received from the agent(s) 210 and updates the display UI 236, for example, as the UI components are received from the agent(s) 210.

In one or more implementations, the UI generation module 212 (or the priority identification module 206) predicts, based on the UI update rate 226 and previous user inputs 220, one or more future ranges of UI components to include in the display UI 236 and prioritizes those UI components. The results for jobs corresponding to a future range of UI components are maintained or cached and used, in response to receipt of a user input 220 to display or otherwise present that future range of UI components. The UI generation module 212 predicts a future range of UI components in various manners, such as by detecting patterns in the user inputs using any of a variety of public or proprietary techniques. For example, the UI generation module 212 predicts, in response to a threshold number of immediately previous user inputs 220 to scroll forward a particular amount in a grid, that the next user input 220 is to scroll forward that particular amount in the grid.

For example, assume a grid has three rows of thumbnail images and the user is providing user inputs 220 by repeatedly selecting a scroll button that scrolls the grid three rows ahead. In response to five previous selections of the scroll button with a particular amount of time (e.g., 5 seconds) between user inputs 220 (resulting in a low UI update rate 226), the UI generation module 212 predicts that the next user input 220 is selection of the scroll button after approximately that same particular amount of time. Accordingly, in response to the most recent user input 220, the UI generation module 212 communicates jobs 222 to display the appropriate three rows of thumbnail images resulting from that user input, then also communicates jobs 222 to receive data to display for the next three rows of thumbnail images to be displayed assuming the predicted user input 220 is received next. Accordingly, if the predicted user input 220 is received, the UI components for the UI display based on that predicted user input 220 are readily available and the UI generation module 212 quickly updates the UI display. In one or more implementations, the UI generation module 212 assigns a higher priority to jobs to display the appropriate three rows of thumbnail images resulting from the most recent user input 220 and assigns a lower priority to jobs to receive data to display for the next three rows of thumbnail images to be displayed assuming the predicted user input 220 is received next.

The job scheduling system 108 thus uses various techniques to cancel and reschedule jobs. Some techniques are performed by UI generation module 212 (e.g., canceling or prioritizing jobs based on the visible components identification 228 or based on the component priority indication) and some techniques are performed by the speed based job module 232 (e.g., rescheduling jobs or canceling jobs).

Example Procedures

The following discussion describes techniques that are implemented utilizing the previously described systems and devices. Aspects of the procedure are implemented in hardware, firmware, software, or a combination thereof. The procedure is shown as a set of blocks that specify operations performed by one or more devices and are not necessarily limited to the orders shown for performing the operations by the respective blocks. In portions of the following discussion, reference is made to FIGS. 1-3.

Figure 4:
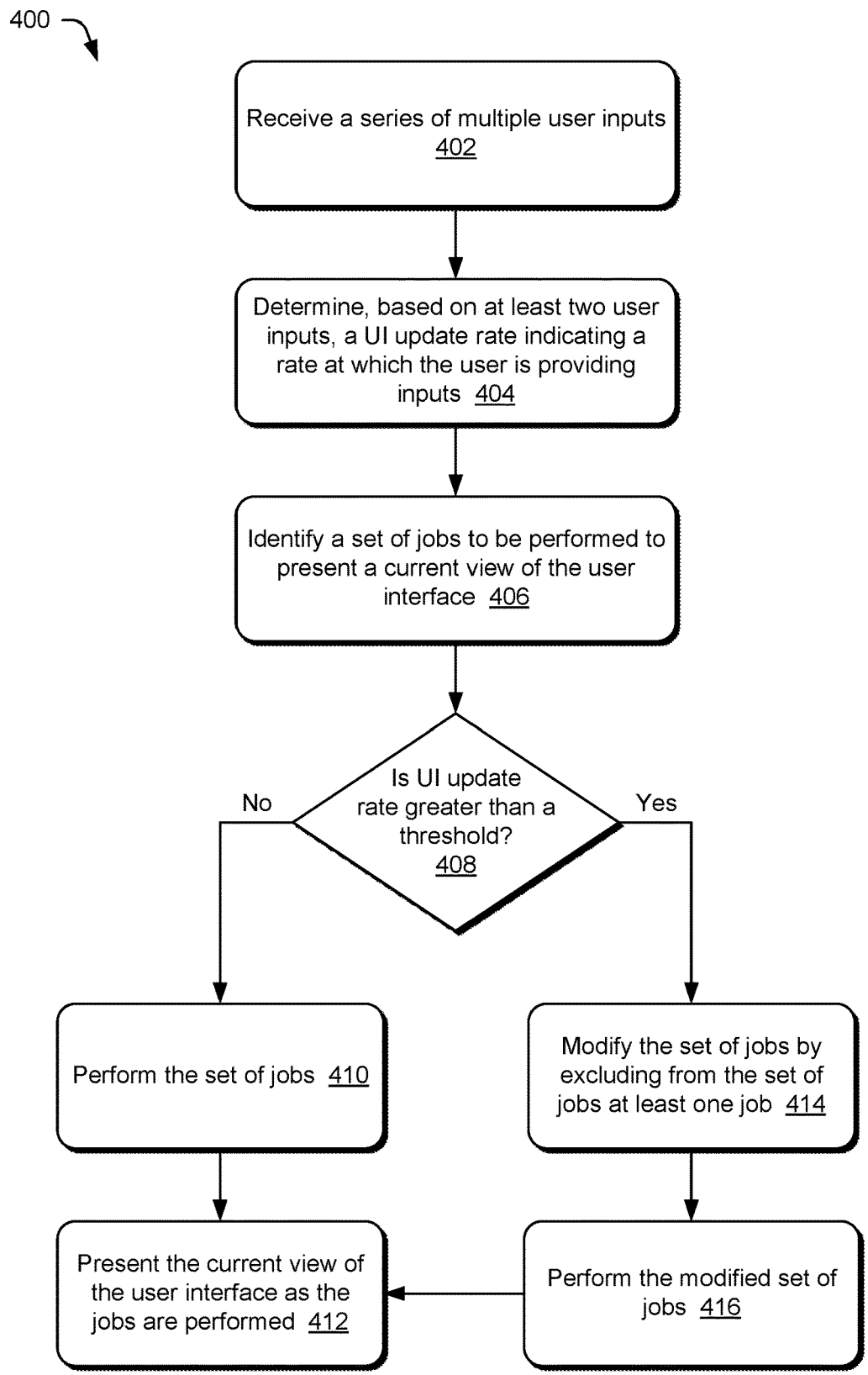
FIG. 4 is a flow diagram depicting a procedure in an example implementation of a job scheduling system.

FIG. 4 is a flow diagram depicting a procedure in an example 400 implementation of job scheduling system 108. In this example, a series of multiple user inputs are received, including a first user input and a second user input (block 402). Examples of these user inputs include inputs to scroll through a grid or other presentation of data, inputs to resize a display area where UI components are displayed, inputs to resize UI components, and so forth.

A UI update rate is determined, based on at least two of the user inputs, indicating a rate at which the user is providing inputs (block 404). This UI update rate also provides an estimate of when the next user input is expected to be received.

A set of jobs to be performed to present a current view of the user interface is identified (block 406). This set of jobs takes into account, for example, which UI components are currently visible or presentable.

A check is made as to whether the UI update rate is greater than a threshold value (block 408). This threshold value is set as, for example, an amount of time that all (or at least a large number) of the jobs to be performed to update the UI in response to a user input are estimated to be performed.

In response to determining that the UI update rate is not greater than the threshold value, the set of jobs identified in block 406 is performed (block 410). The current view of the user interface is presented as the jobs identified in block 406 are performed (block 412).

However, in response to determining that the UI update rate is greater than the threshold value (or equal to the threshold value), the set of jobs identified in block 406 is modified to exclude at least one job from the set of jobs (block 414). This results in a modified set of jobs. The set of jobs is modified in various manners as discussed above, such as based on priorities of the jobs, a speed delay for the job, and so forth.

The jobs in the modified set of jobs are performed (block 416) and the current view of the user interface is presented as the jobs in the modified set of jobs are performed (block 412).

Example System and Device

Figure 5:
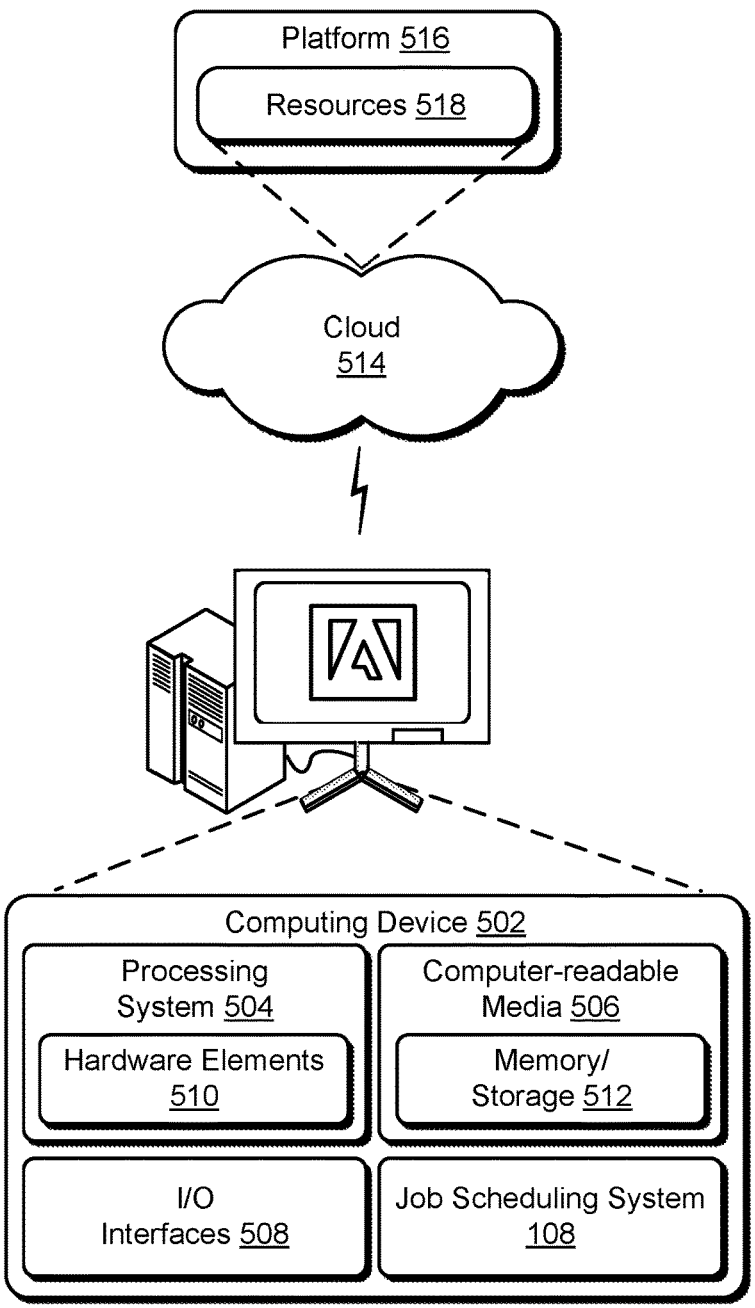
FIG. 5 illustrates an example system including various components of an example device that is implemented as any type of computing device as described and/or utilized with reference to FIGS. 1-4 to implement aspects of the techniques described herein.

FIG. 5 illustrates an example system generally at 500 that includes an example computing device 502 that is representative of one or more computing systems and/or devices that implement the various techniques described herein. This is illustrated through inclusion of the job scheduling system 108. The computing device 502 is, for example, a server of a service provider, a device associated with a client (e.g., a client device), an on-chip system, and/or any other suitable computing device or computing system.

The example computing device 502 as illustrated includes a processing system 504, one or more computer-readable media 506, and one or more I/O interface 508 that are communicatively coupled, one to another. Although not shown, in one or more implementations the computing device 502 further includes a system bus or other data and command transfer system that couples the various components, one to another. A system bus includes any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 504 is representative of functionality to perform one or more operations using hardware. Accordingly, the processing system 504 is illustrated as including hardware element 510 that are configured, for example, as processors, functional blocks, and so forth. The processing system 504 is optionally implemented in hardware as an application specific integrated circuit or other logic device formed using one or more semiconductors. The hardware elements 510 are not limited by the materials from which they are formed, or the processing mechanisms employed therein. For example, in one or more implementations processors are comprised of semiconductor(s) and/or transistors (e.g., electronic integrated circuits (ICs)). In such a context, processor-executable instructions include electronically-executable instructions.

The computer-readable storage media 506 is illustrated as including memory/storage 512. The memory/storage 512 represents memory/storage capacity associated with one or more computer-readable media. The memory/storage 512 component includes one or both of volatile media (such as random access memory (RAM)) and nonvolatile media (such as read only memory (ROM), Flash memory, optical disks, magnetic disks, and so forth). The memory/storage 512 component includes one or both of fixed media (e.g., RAM, ROM, a fixed hard drive, and so on) and removable media (e.g., Flash memory, a removable hard drive, an optical disc, and so forth). The computer-readable media 506 is optionally configured in a variety of other ways as further described below.

Input/output interface(s) 508 are representative of functionality to allow a user to enter commands and information to computing device 502, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which employs visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 502 is configured in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are implemented on one or more of a variety of commercial computing platforms having a variety of processors.

An implementation of the described modules and techniques is optionally stored on or transmitted across some form of computer-readable media. The computer-readable media includes a variety of media that is accessed by the computing device 502. By way of example, and not limitation, computer-readable media includes "computer-readable storage media" and "computer-readable signal media."

"Computer-readable storage media" refers to media and/or devices that enable persistent and/or non-transitory storage of information in contrast to mere signal transmission, carrier waves, or signals per se. Computer-readable storage media is non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which is accessed by a computer.

"Computer-readable signal media" refers to a signal-bearing medium that is configured to transmit instructions to the hardware of the computing device 502, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 510 and computer-readable media 506 are representative of modules, programmable device logic and/or fixed device logic implemented in a hardware form that are employed in some implementations to implement at least some aspects of the techniques described herein, such as to perform one or more instructions. Hardware includes one or more of components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are optionally employed to implement various techniques described herein. Accordingly, in one or more implementations software, hardware, or executable modules are implemented as one or more instructions and/or logic embodied on some form of computer-readable storage media and/or by one or more hardware elements 510. The computing device 502 is configured to implement particular instructions and/or functions corresponding to the software and/or hardware modules. Accordingly, implementation of a module that is executable by the computing device 502 as software is achieved at least partially in hardware, e.g., through use of computer-readable storage media and/or hardware elements 510 of the processing system 504. The instructions and/or functions are executable/operable by one or more articles of manufacture (for example, one or more computing devices 502 and/or processing systems 504) to implement techniques, modules, and examples described herein.

The techniques described herein are supported by various configurations of the computing device 502 and are not limited to the specific examples of the techniques described herein. Additionally or alternatively, this functionality is implemented all or in part through use of a distributed system, such as over a "cloud" 514 via a platform 516 as described below.

The cloud 514 includes and/or is representative of a platform 516 for resources 518. The platform 516 abstracts underlying functionality of hardware (e.g., servers) and software resources of the cloud 514. The resources 518 include applications and/or data that are utilized while computer processing is executed on servers that are remote from the computing device 502. Resources 518 also include services provided over the Internet and/or through a subscriber network, such as a cellular or Wi-Fi network.

The platform 516 abstracts resources and functions to connect the computing device 502 with other computing devices. The platform 516 also optionally serves to abstract scaling of resources to provide a corresponding level of scale to encountered demand for the resources 518 that are implemented via the platform 516. Accordingly, in an interconnected device embodiment, implementation of functionality described herein are distributed throughout the system 500. For example, the functionality is implemented in part on the computing device 502 as well as via the platform 516 that abstracts the functionality of the cloud 514.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A device, comprising:
a processor; and
computer-readable storage media storing instructions that, responsive to execution by the processor, cause the processor to perform operations including:
receiving a first user input and a second user input of multiple user inputs to a user interface (UI);
generating a set of jobs to be performed to present a view of the UI that is to be displayed responsive to the second user input;
determining, based on the first user input and the second user input, a UI update rate at which a user is providing user inputs to the UI;
receiving indications of a first function and a second function associated with a job in the set of jobs, the second function performing one or more operations faster than the first function; and
presenting the view of the UI by performing the set of jobs, in part, by performing the second function rather than the first function based on the UI update rate being greater than a threshold value.

2. The device of claim 1, the operations further including receiving indications of a first amount of time associated with the first function and a second amount of time associated with the second function, the operations further including performing the second function rather than the first function after the second amount of time based on the UI update rate being greater than the threshold value.

3. The device of claim 2, wherein the first amount of time and the second amount of time are greater than zero, and the first amount of time is greater than the second amount of time.

4. The device of claim 2, wherein the second amount of time is greater than zero, the operations further comprising:
determining, during the second amount of time, whether to delay performance of the job or perform the second function; and
delaying, based on the determining, the performance of the job.

5. The device of claim 4, wherein delaying the performance of the job includes delaying the performance of the job until the UI update rate drops below an additional threshold value, the additional threshold value being less than the threshold value.

6. The device of claim 2, wherein the second amount of time is zero, the operations further including running the second function immediately without determining whether to delay performance of the job.

7. The device of claim 1, wherein the threshold value is an estimated amount of time to perform the set of jobs.

8. The device of claim 7, the operations further including updating the estimated amount of time for future sets of jobs based on whether the set of jobs is performed within the estimated amount of time.

9. The device of claim 1, the operations further including presenting the view of the UI by performing the set of jobs, in part, by performing the first function rather than the second function based on the UI update rate being less than or equal to the threshold value.

10. The device of claim 1, the operations further comprising determining, based on the UI update rate, an estimated amount of time to retrieve data for a set of visible components associated with the view of the UI, wherein presenting the view of the UI includes updating the UI while the data is retrieved based on the estimated amount of time being greater than a threshold amount of time, and wherein presenting the view of the UI includes delaying updating the UI until after the data is retrieved based on the estimated amount of time being less than or equal to the threshold amount of time.

11. A non-transitory computer-readable medium storing executable instructions, which when executed by a processing device, cause the processing device to perform operations comprising:
receiving a first user input and a second user input of multiple user inputs to a user interface (UI);
generating a set of jobs to be performed to present a view of the UI that is to be displayed responsive to the second user input;
determining, based on the first user input and the second user input, a UI update rate at which a user is providing user inputs to the UI;
receiving indications of a first function and a second function associated with a job in the set of jobs, the first function completing the job and the second function performing one or more operations faster than the first function; and
presenting the view of the UI by performing the set of jobs, in part, by performing the first function rather than the second function based on the UI update rate being less than or equal to a threshold value.

12. The non-transitory computer-readable medium of claim 11, the operations further comprising receiving indications of a first amount of time associated with the first function and a second amount of time associated with the second function, the operations further including performing the first function rather than the second function after the first amount of time based on the UI update rate being less than or equal to the threshold value.

13. The non-transitory computer-readable medium of claim 12, wherein the first amount of time is greater than zero, the operations further comprising:
determining, during the first amount of time, whether to delay performance of the job or perform the first function; and
delaying, based on the determining, the performance of the job.

14. The non-transitory computer-readable medium of claim 13, wherein delaying the performance of the job includes delaying the performance of the job until the UI update rate drops below an additional threshold value, the additional threshold value being less than the threshold value.

15. The non-transitory computer-readable medium of claim 12, wherein the first amount of time is zero, the operations further comprising running the first function immediately without determining whether to delay performance of the job.

16. The non-transitory computer-readable medium of claim 11, the operations further comprising presenting the view of the UI by performing the set of jobs, in part, by performing the second function rather than the first function based on the UI update rate being greater than the threshold value.

17. A method, comprising:
receiving a first user input and a second user input of multiple user inputs to a user interface (UI);
generating a set of jobs to be performed to present a view of the UI that is to be displayed responsive to the second user input;
determining, based on the first user input and the second user input, a UI update rate at which a user is providing user inputs to the UI;
determining, based on the UI update rate, an estimated amount of time to retrieve visible components associated with the view of the UI;
determining, based on the UI update rate and the estimated amount of time, whether a threshold amount of the visible components are estimated to be retrieved prior to a next user input;
updating the UI while the visible components are retrieved responsive to determining that the threshold amount of the visible components are not estimated to be retrieved prior to the next user input; and
delaying updating the UI until after the visible components are retrieved responsive to determining that the threshold amount of the visible components are estimated to be retrieved prior to the next user input.

18. The method of claim 17, further comprising:
predicting, based on the UI update rate and before the next user input is received, at least one job that is not estimated to run prior to the next user input; and
modifying the set of jobs by excluding the at least one job from the set of jobs, resulting in a modified set of jobs, wherein updating the UI includes performing the modified set of jobs.

19. The method of claim 18, wherein excluding the at least one job from the set of jobs includes canceling a first job of the at least one job and rescheduling a second job of the at least one job for performance at a subsequent time.

20. The method of claim 17, further comprising receiving indications of a first function and a second function associated with a job in the set of jobs, the second function performing one or more operations faster than the first function, wherein updating the UI includes presenting the view of the UI by performing the set of jobs, in part, by performing the second function rather than the first function based on the UI update rate being greater than a threshold value.

\* \* \* \* \*